US012135511B2

(12) United States Patent
Arimatsu et al.

(10) Patent No.: US 12,135,511 B2
(45) Date of Patent: Nov. 5, 2024

(54) SHUTTER MECHANISM, TONER CONTAINER, TONER CARTRIDGE, AND IMAGE FORMING APPARATUS

(71) Applicants: Hideki Arimatsu, Shizuoka (JP); Seiji Terazawa, Shizuoka (JP); Sho Matsuyama, Shizuoka (JP)

(72) Inventors: Hideki Arimatsu, Shizuoka (JP); Seiji Terazawa, Shizuoka (JP); Sho Matsuyama, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/019,247

(22) PCT Filed: Sep. 3, 2021

(86) PCT No.: PCT/IB2021/058047
§ 371 (c)(1),
(2) Date: Feb. 2, 2023

(87) PCT Pub. No.: WO2022/058833
PCT Pub. Date: Mar. 24, 2022

(65) Prior Publication Data
US 2023/0280674 A1 Sep. 7, 2023

(30) Foreign Application Priority Data
Sep. 17, 2020 (JP) ................................ 2020-156110

(51) Int. Cl.
*G03G 15/08* (2006.01)

(52) U.S. Cl.
CPC . *G03G 15/0886* (2013.01); *G03G 2215/0692* (2013.01)

(58) Field of Classification Search
CPC .................. G03G 15/0886; G03G 2215/0692
See application file for complete search history.

(56) References Cited

U.S. PATENT DOCUMENTS

| | | | | |
|---|---|---|---|---|
| 2010/0166460 A1 | 7/2010 | Maeshima | | |
| 2013/0330105 A1* | 12/2013 | Komatsu | ............ | G03G 15/0886 399/262 |

(Continued)

FOREIGN PATENT DOCUMENTS

| | | |
|---|---|---|
| JP | 2007-238205 A | 9/2007 |
| JP | 2010-170100 A | 8/2010 |

(Continued)

OTHER PUBLICATIONS

International Search Report issued on Oct. 28, 2021 in PCT/IB2021/058047 filed on Sep. 3, 2021, 10 pages.

(Continued)

*Primary Examiner* — Sandra Brase
(74) *Attorney, Agent, or Firm* — XSENSUS LLP

(57) ABSTRACT

A shutter mechanism includes a shutter, a shutter support, and an elastic member. The shutter moves in one direction to close an opening. The shutter support supports the shutter. The elastic member biases the shutter and the shutter support in opposite directions. The shutter includes an abutting portion to hook on the shutter support with the abutting portion being biased by the elastic member. At least one of the abutting portion and the shutter support has a hook strengthening structure to strengthen hooking of the shutter on the shutter support.

19 Claims, 11 Drawing Sheets

(56) References Cited

U.S. PATENT DOCUMENTS

| | | | |
|---|---|---|---|
| 2014/0241757 A1 | 8/2014 | Kikuchi et al. | |
| 2014/0270859 A1 | 9/2014 | Hosokawa et al. | |
| 2014/0348551 A1 | 11/2014 | Yamabe et al. | |
| 2015/0338775 A1* | 11/2015 | Hosokawa ......... | G03G 15/0886 399/258 |
| 2016/0124346 A1 | 5/2016 | Yamabe et al. | |
| 2016/0161885 A1 | 6/2016 | Hosokawa et al. | |
| 2017/0102638 A1 | 4/2017 | Yamabe et al. | |
| 2017/0108799 A1 | 4/2017 | Hosokawa et al. | |
| 2017/0139350 A1 | 5/2017 | Yano et al. | |
| 2019/0079432 A1 | 3/2019 | Hosokawa et al. | |
| 2019/0243286 A1 | 8/2019 | Tanaka et al. | |
| 2020/0142331 A1 | 5/2020 | Hosokawa et al. | |
| 2020/0192243 A1 | 6/2020 | Kitamura et al. | |
| 2021/0116839 A1 | 4/2021 | Hosokawa et al. | |
| 2021/0116840 A1 | 4/2021 | Hosokawa et al. | |

FOREIGN PATENT DOCUMENTS

| | | |
|---|---|---|
| JP | 2014-112120 | 6/2014 |
| JP | 2014-164107 A | 9/2014 |
| JP | 2016-018003 | 2/2016 |
| WO | WO 2015/141861 A1 | 9/2015 |

OTHER PUBLICATIONS

Office Action issued Feb. 6, 2024 in Japanese Patent Application No. 2020-156110, 7 pages.

* cited by examiner

SHUTTER MECHANISM, TONER CONTAINER, TONER CARTRIDGE, AND IMAGE FORMING APPARATUS

CROSS-REFERENCE TO RELATED APPLICATION

This application is based on PCT filing PCT/IB2021/058047, filed on Sep. 3, 2021, which claims the priority to Japanese Patent Application No. 2020-156110, filed on Sep. 17, 2020, the entire contents of each are incorporated herein by reference in its entirety.

TECHNICAL FIELD

Embodiments of the present disclosure relate to a shutter mechanism, a toner container, a toner cartridge, and an image forming apparatus.

BACKGROUND ART

There is known a technology of a toner container having a shutter that is pushed and opened by a toner supply part of a main body of an apparatus upon insertion of the toner container into the main body and is automatically closed by an elastic force of a spring when the toner container is pulled out (e.g., Japanese Unexamined Patent Application Publication No. 2014-112120).

In conventional shutter mechanisms, two claws that are line-symmetric with respect to the line of action of the elastic force of the spring are used as one of the shutter holding mechanisms so that the shutter does not pop out due to the elastic force of the spring when the shutter is closed.

The claws open and close in the direction perpendicular to the elastic force of the spring, and functions as a holding mechanism when the claws are opened.

The elastic force of the spring presses the open claws against a holder component that fixes the shutter in the same direction as the elastic force, thus preventing the shutter from popping out.

However, if the shutter deteriorates due to long-term use and an impact such as dropping is applied to the shutter, the claws may be closed due to the combination of the impact and the elastic force of the spring. Accordingly, there is a problem that the shutter may pop out.

CITATION LIST

Patent Literature

[PTL 1]
Japanese Unexamined Patent Application Publication No. 2014-112120

SUMMARY OF INVENTION

Technical Problem

An object of the present disclosure is to provide a shutter mechanism that prevents a shutter component from coming off due to an impact or the like.

Solution to Problem

In order to solve the above-described problem, an embodiment of the present disclosure provides a shutter mechanism that includes a shutter, a shutter support, and an elastic member. The shutter moves in one direction to close an opening. The shutter support supports the shutter. The elastic member biases the shutter and the shutter support in opposite directions. The shutter includes an abutting portion to hook on the shutter support with the abutting portion being biased by the elastic member. At least one of the abutting portion and the shutter support has a hook strengthening structure to strengthen hooking of the shutter on the shutter support.

Advantageous Effects of Invention

According to the present disclosure, a shutter mechanism that prevents a shutter component from coming off due to an impact or the like can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 18A and 18B are schematic diagrams illustrating a main part of a shutter mechanism according to a first embodiment.

FIGS. 19A and 19B are schematic diagrams illustrating a main part of a shutter mechanism according to a second embodiment.

FIGS. 20A to 20D are schematic diagrams illustrating a main part of a shutter mechanism according to a third embodiment.

FIGS. 21A and 21B are schematic diagrams illustrating a main part of a shutter mechanism according to a fourth embodiment.

FIG. 22 is a schematic diagram illustrating a main part of a shutter mechanism according to a fifth embodiment.

DESCRIPTION OF EMBODIMENTS

Figure 1:
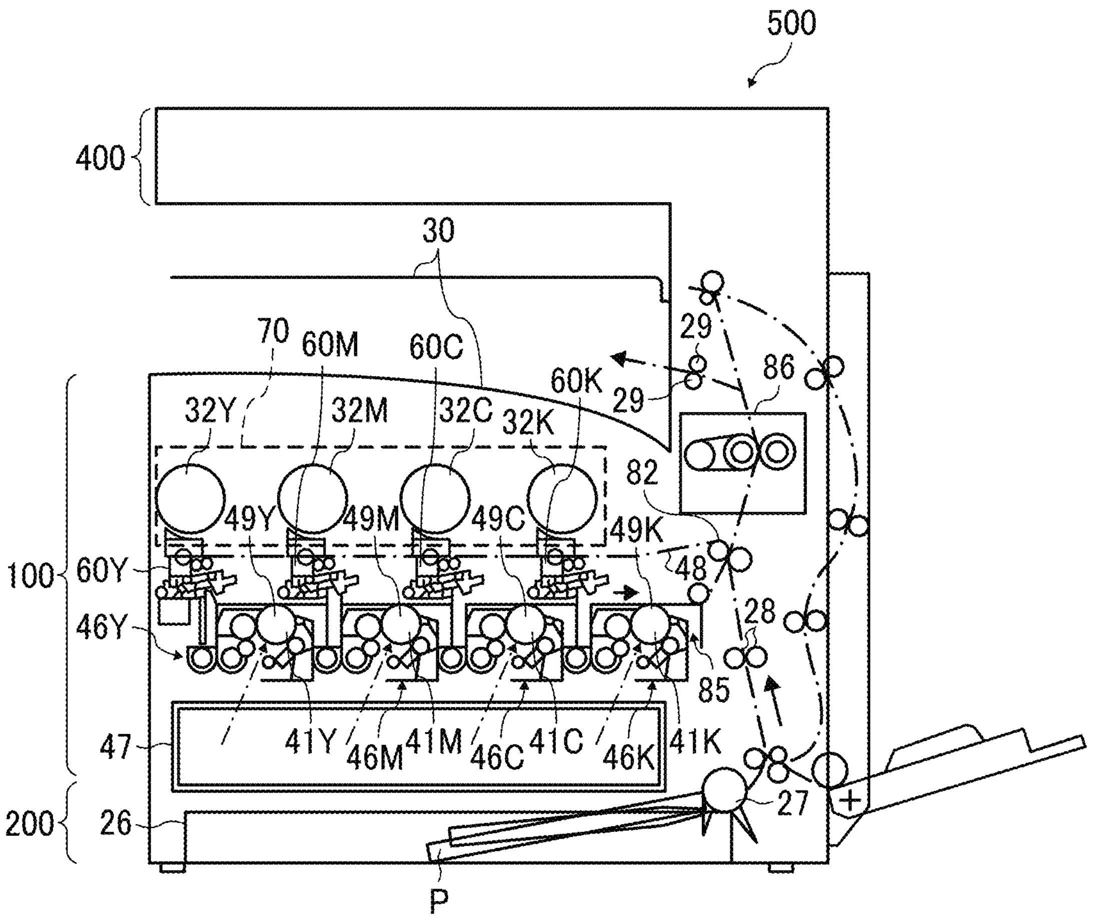
FIG. 1 is a schematic view of an image forming apparatus according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to the attached drawings. In the drawings for illustrating embodiments of the present disclosure, elements or components identical or similar in function or shape are given identical reference numerals as far as distinguishable, and redundant descriptions are omitted.

First, an image forming apparatus to which a toner container to which a shutter mechanism according to an embodiment is applied (hereinafter, also appropriately referred to as "the toner container according to an embodiment") can be attached and detached is described.

FIG. 1 is a schematic view of an image forming apparatus according to an embodiment of the present disclosure. A configuration example of a copier 500 as an example of the image forming apparatus is described in FIG. 1. The copier 500 includes a main body (hereinafter referred to as "printer unit 100"), a sheet feeding table (hereinafter referred to as "sheet feeder 200"), and a scanner disposed above the printer unit 100 (hereinafter referred to as "scanner unit 400").

A toner container mount 70 is disposed in an upper portion of the printer unit 100. Four detachable (replaceable) toner containers 32Y, 32M, 32C, and 32K as powder containers (also collectively referred to as "toner containers 32") to contain yellow, magenta, cyan, and black toners, respectively, are disposed in the toner container mount 70. An intermediate transfer unit 85 is disposed below the toner container mount 70.

An intermediate transfer unit 85 includes an intermediate transfer belt 48 (serving as an intermediate transferor), four primary transfer rollers 49Y, 49M, 49C, and 49K, a secondary transfer backup roller 82, a plurality of tension rollers, and an intermediate transfer belt cleaner. The intermediate transfer belt 48 is stretched and supported by the above-described multiple rollers and is rotated in the direction indicated by arrow in FIG. 1 as the secondary transfer backup roller 82 of the multiple rollers rotates.

In the printer unit 100, four image forming units 46Y, 46M, 46C, and 46K (also collectively referred to as "image forming units 46") are arranged in parallel, facing the intermediate transfer belt 48 to form yellow, magenta, cyan, and black toner images, respectively. Four toner supply devices 60Y, 60M, 60C, and 60K (also collectively referred to as "toner supply devices 60") are disposed below the corresponding four toner containers 32Y, 32M, 32C, and 32K, respectively. The toner supply devices 60Y, 60M, 60C, and 60K supply toners (serving as powder) contained in the corresponding toner containers 32Y, 32M, 32C, and 32K to developing devices 50 (see developing device 50Y in FIG. 2) of the corresponding image forming units 46Y, 46M, 46C, and 46K, respectively.

As illustrated in FIG. 1, the printer unit 100 further includes an exposure device 47 as a latent image forming device below the four image forming units 46. The exposure device 47 irradiates and scans surfaces of photoconductors 41Y, 41M, 41C, and 41K based on image data read by the scanner unit 400, and forms latent images on the surfaces of the photoconductors 41Y, 41M, 41C, and 41K. The image data may be either that read by the scanner unit 400 or that input from an external device such as a personal computer connected to the copier 500.

Detailed descriptions of the image forming process by, e.g., the image forming units 46Y, 46M, 46C, and 46K, the photoconductors 41Y, 41M, 41C, and 41K, the exposure device 47, and the developing devices are omitted. For example, substantially the same description as the description of the image forming process with reference to FIGS. 2 and 3 in Japanese Unexamined Patent Application Publication No. 2014-112120 can be applied.

The sheet feeder 200 conveys a recording medium P from a sheet feeding tray 26 disposed below the printer unit 100 to the image forming process via, e.g., a feed roller 27 and a registration roller pair 28. The recording medium P onto which multicolor toner images are transferred in the image forming process is conveyed to a fixing device 86. The fixing device 86 fixes the multicolor toner images on the recording medium P. After passing through the fixing device 86, the recording medium P is ejected by an output roller pair 29 to the outside of the printer unit 100. The recording medium P is sequentially stacked on a stack tray 30 as output images. The above description is an outline of the printer unit 100 of the copier 500.

Figure 2:
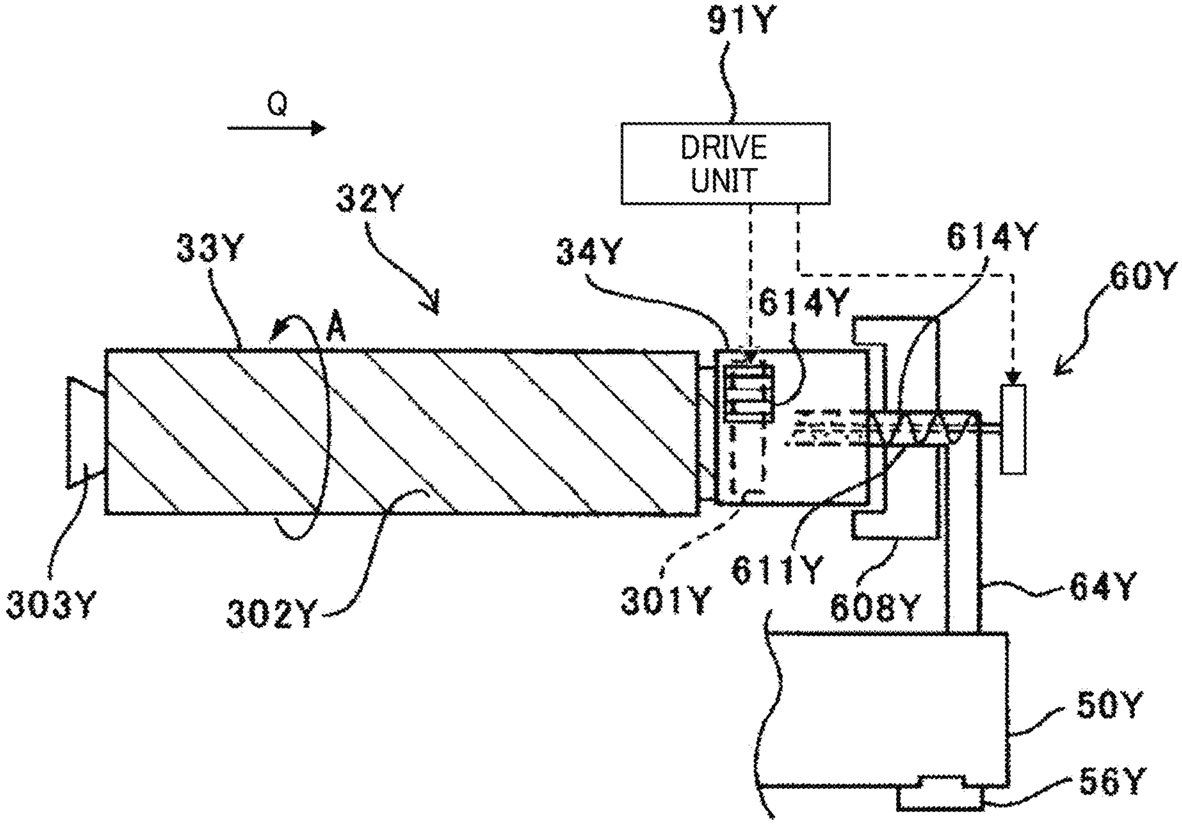
FIG. 2 is a schematic diagram illustrating a state in which a toner container is disposed in a toner supply device in the image forming apparatus illustrated in FIG. 1.
Figure 3:
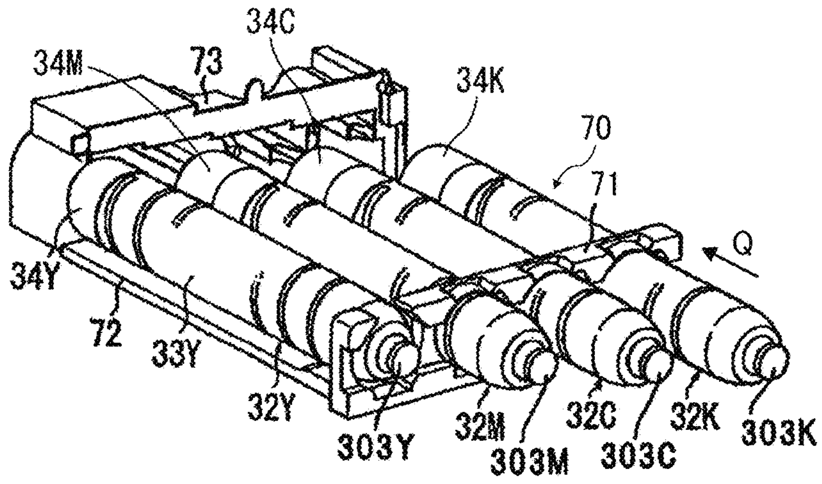
FIG. 3 is a schematic perspective view of an example illustrating a state in which the toner container is disposed in the toner supply device.

Next, the toner containers 32Y, 32M, 32C, and 32K and the toner supply devices 60Y, 60M, 60C, and 60K are described in further detail. FIG. 2 is a schematic diagram illustrating a state in which the toner container 32Y is attached to the toner supply device 60Y. FIG. 3 is a perspective diagram illustrating a state in which the four toner containers 32Y, 32M, 32C, and 32K are attached in the toner container mount 70.

The respective color toners contained in the toner containers 32Y, 32M, 32C, and 32K attached in the toner container mount 70 of the printer unit 100 are supplied into the corresponding developing devices 50 of the image forming units 46Y, 46M, 46C, and 46K according to the amount of toner consumption in the developing devices 50. Toner concentration sensors 56Y, 56M, 56C, and 56K detect concentrations of the toners in the developing devices 50Y, 50M, 50C, and 50K, respectively. The toner supply devices 60Y, 60M, 60C, and 60K supply the respective color toners from the toner containers 32Y, 32M, 32C, and 32K to the corresponding developing devices 50Y, 50M, 50C, and 50K, respectively. The four toner supply devices 60Y, 60M, 60C, and 60K have a similar configuration except the color of the toner used in the image forming processes. The toner containers 32Y, 32M, 32C, and 32K have a similar configuration except the color of the toner used in the image forming processes. Therefore, the toner supply device 60Y and the toner container 32Y for yellow are described below as representatives. Descriptions of the toner supply devices 60M, 60C, and 60K and the toner containers 32M, 32C, and 32K for the three other colors may be omitted.

The toner supply devices 60Y, 60M, 60C, and 60K include the toner container mount 70, conveyance nozzles 611Y, 611M, 611C, and 611K as conveyance tubes, conveyance screws 614Y, 614M, 614C, and 614K as conveyors, toner downward conveyance passages 64Y, 64M, 64C, and 64K, and drive units 91Y, 91M, 91C, and 91K to rotate the toner containers 32Y, 32M, 32C, and 32K, respectively. For convenience of explanation, one end of a container body 33, which is described later, on which a container opening portion 33*a* is disposed is referred to as "front end of the toner container" with respect to the direction of attachment of the toner container 32Y to the toner supply device 60Y. An opposite end of the container body 33 on which a handle 303, which is described later, is disposed is referred to as the "rear end of the toner container". In conjunction with insertion of the toner container 32Y into the toner container mount 70 of the printer unit 100 in the direction indicated by arrow Q illustrated in FIG. 4, the conveyance nozzle 611Y of the toner supply device 60Y is inserted into the toner container 32Y from the front end side of the toner container 32Y. With this action, the interior of the toner container 32Y communicates with the interior of the conveyance nozzle 611Y.

The toner container 32Y is, for example, a substantially cylindrical toner bottle, as a form of the toner container. The toner container 32Y includes a container front-end cover 34Y irrotationally held by the toner container mount 70 and the container body 33Y (serving as a toner storage member) formed together with a container gear 301Y. The container body 33Y is held to be rotatable relative to the container front-end cover 34Y.

The toner container mount 70 mainly includes a container-cover receiver 73, a container receiver 72, and an insertion port part 71, as illustrated in FIG. 3. The container-cover receiver 73 holds the container front-end cover 34Y of the toner container 32Y. The container receiver 72 holds the container body 33Y of the toner container 32Y. The insertion port part 71, together with the container receiver 72, defines an insertion port into which the toner container 32Y is attached. Note that a socket 608Y illustrated in FIG. 2 is a portion of the container-cover receiver 73 of the toner container mount 70.

Herein, the longitudinal length of the container receiver 72 is almost equal to the longitudinal length of the container body 33Y. The container-cover receiver 73 is disposed at one end of the container receiver 72 on which the front-end of the toner container 32Y is disposed in the longitudinal direction (the direction of attachment) of the container receiver 72. The insertion port part 71 is disposed at another end of the container receiver 72 in the longitudinal direction of the container receiver 72. In FIG. 3, directly below the four toner containers 32, grooves are disposed that extend from the insertion port part 71 to the container-cover receiver 73, and the long side of the grooves coincides with the axial direction of the container body 33.

Next, the toner containers 32Y, 32M, 32C, and 32K according to an embodiment of the present disclosure are described below in further detail. As described above, the toner containers 32Y, 32M, 32C, and 32K have substantially identical configurations, except differing in the color of toner employed. Accordingly, in the descriptions below, the suffixes Y, M, C, and K indicating the color of the toner are omitted below.

Figure 4:
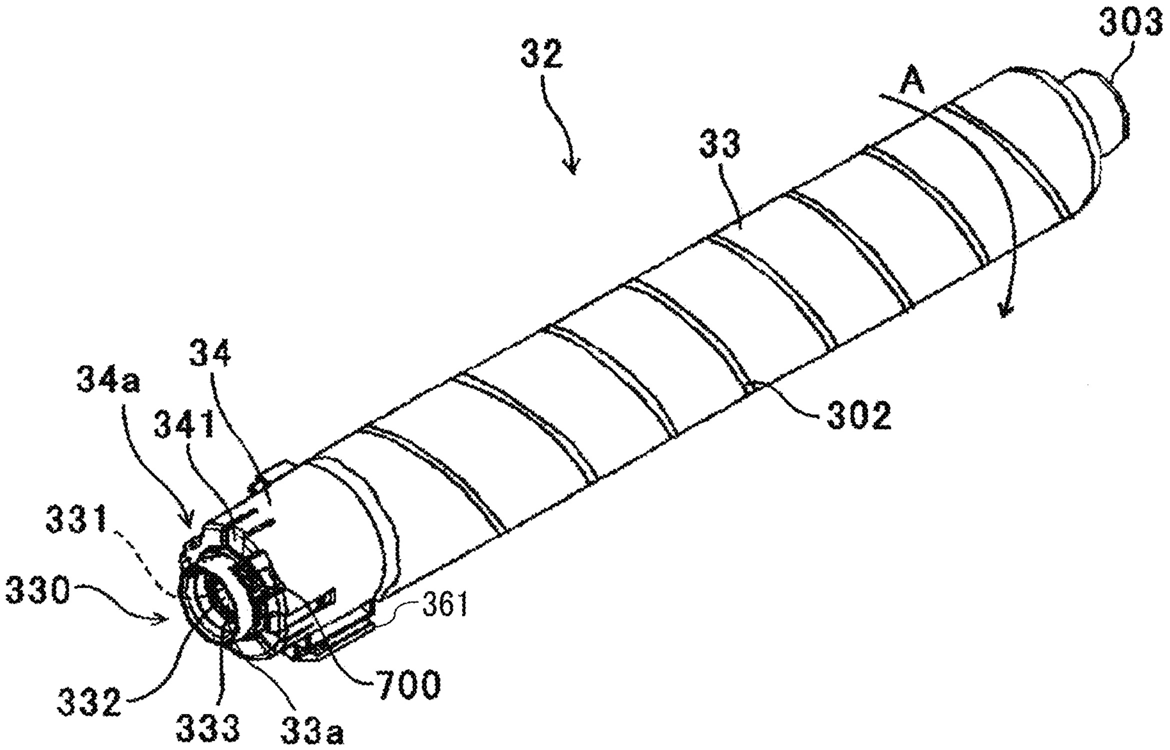
FIG. 4 is a perspective diagram illustrating an example of the configuration of the toner container.

FIG. 4 is a perspective view of the toner container 32. As illustrated in FIG. 4, an identification (ID) tag 700 (e.g., an ID chip) is disposed on the container front-end cover 34, to record data such as usage conditions of the toner container 32. In attachment of the toner container 32, as a slide guide 361 engages a slide rail of the container receiver 72, the posture of the container front-end cover 34 on the toner supply device 60 is determined.

In a state in which the container front-end cover 34Y is attached to the container-cover receiver 73, the rotation driving force is input from the drive unit 91Y to the container gear 301Y of the container body 33Y (see FIG. 2) via a container drive gear. With this driving force, the container body 33Y is rotated in the direction indicated by arrow A illustrated in FIG. 2 (hereinafter "rotation direction A"). When the container body 33Y rotates, a spiral projection 302Y (serving as a rotating conveyor) formed spirally on the inner peripheral surface of the container body 33Y also rotates. The toner contained inside the container body 33Y is conveyed from one end (on which the handle 303Y is disposed) located on the left side in FIG. 2 to the other end (on which the container opening portion 33*a* is disposed) located on the right side along the longitudinal direction of the container body 33Y. Accordingly, the toner is supplied from the container front-end cover 34Y disposed on the other end into the conveyance nozzle 611Y.

The toner containers 32Y, 32M, 32C, and 32K are replaced with new ones when the respective service lives thereof have expired, that is, when almost all toner contained in the toner container 32 has been depleted. The handle 303Y is disposed at the end of the toner container 32Y opposite the container front-end cover 34Y. Users can grasp the handle 303Y to remove the toner container 32Y from the copier 500 in replacement, respectively.

Figure 5:
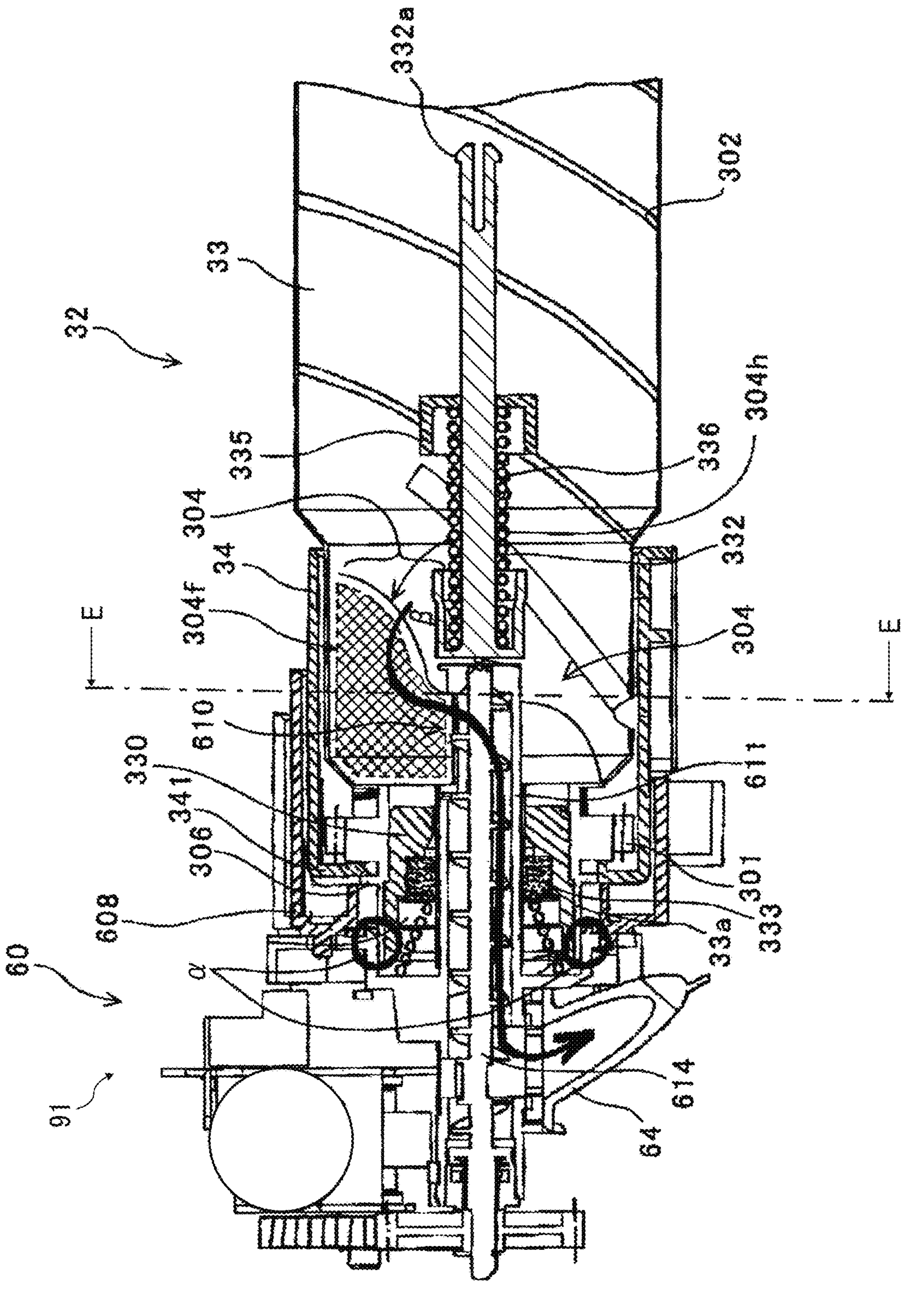
FIG. 5 is a cross-sectional diagram illustrating an example of the toner container and the toner supply device in which the toner container is attached.
Figure 6:
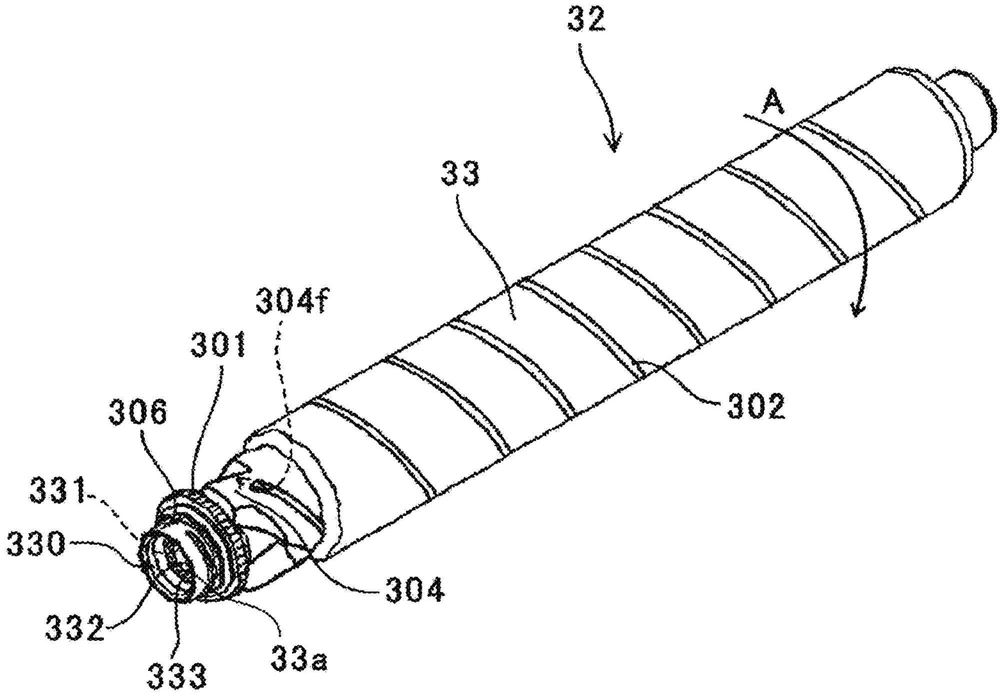
FIG. 6 is a perspective diagram illustrating a state in which a front-end cover is detached from the toner container.

FIG. 5 is a cross-sectional view of the toner supply device 60 and the front end of the toner container 32 attached to the toner supply device 60. FIG. 6 is a perspective diagram illustrating a state in which the container front-end cover 34 is detached from the toner container 32 from the state illustrated in FIG. 4.

As described above, the toner container 32 includes the container body 33 and the container front-end cover 34. In a center area of a front-end face of the toner container 32, a nozzle receiving port 331 is disposed that serves as a nozzle insertion port for receiving the insertion of the conveyance nozzle 611 when the toner container 32 is attached. A container shutter 332 serving as an opening and closing member is disposed to close the nozzle receiving port 331 when the toner container 32 is not attached. The toner container 32 in the present disclosure is not limited to a configuration mainly including the container body 33 and the container front-end cover 34. For example, when the container front-end cover 34 does not include functions such as the slide guide 361 and the ID tag 700, the toner container 32 may be used as a toner container without the container front-end cover 34 as illustrated in FIG. 6. Further, by providing the toner container with functions such as the slide guide 361 and the ID tag 700 a toner container without a container front-end cover can be obtained.

Figure 7:
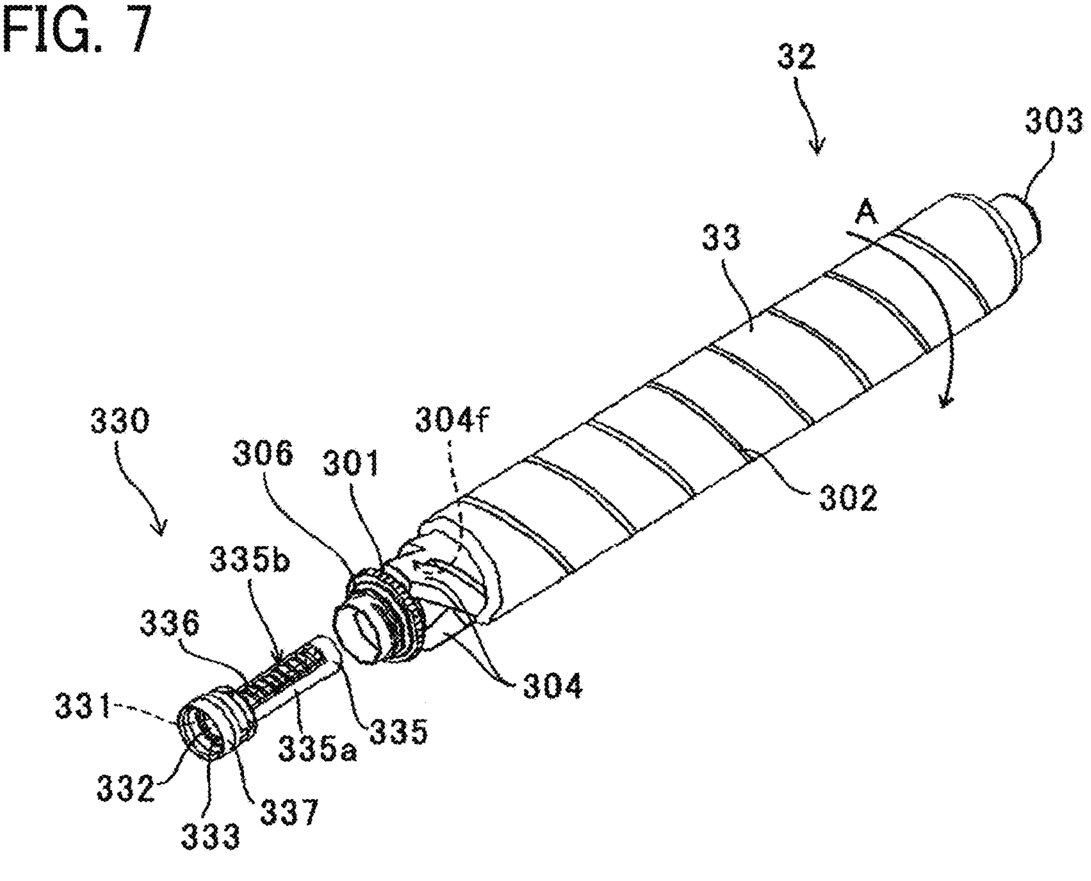
FIG. 7 is a perspective diagram illustrating a state in which a nozzle receiver is detached from a toner container body.
Figure 8A:
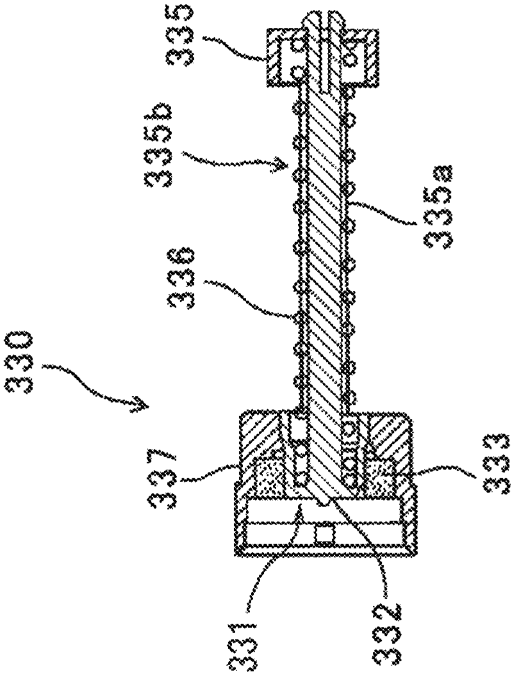
FIGS. 8A and 8B are cross-sectional diagrams illustrating a state in which the nozzle receiver is detached from the toner container body.
Figure 8B:
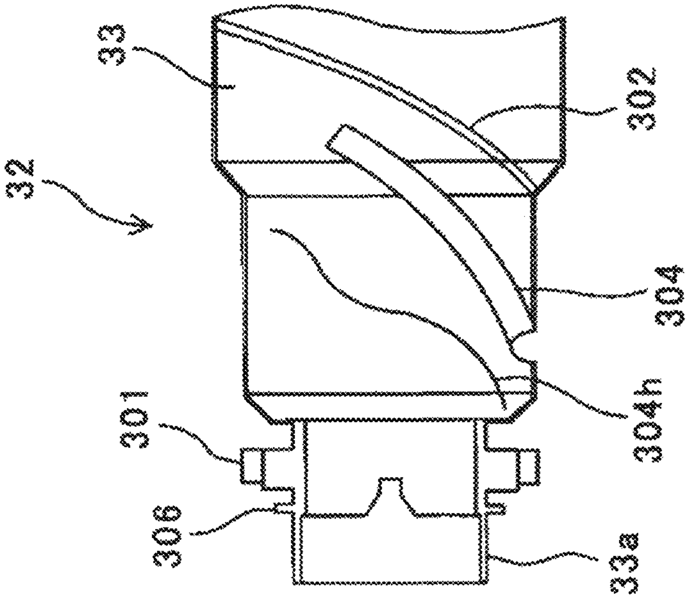
Figure 9:
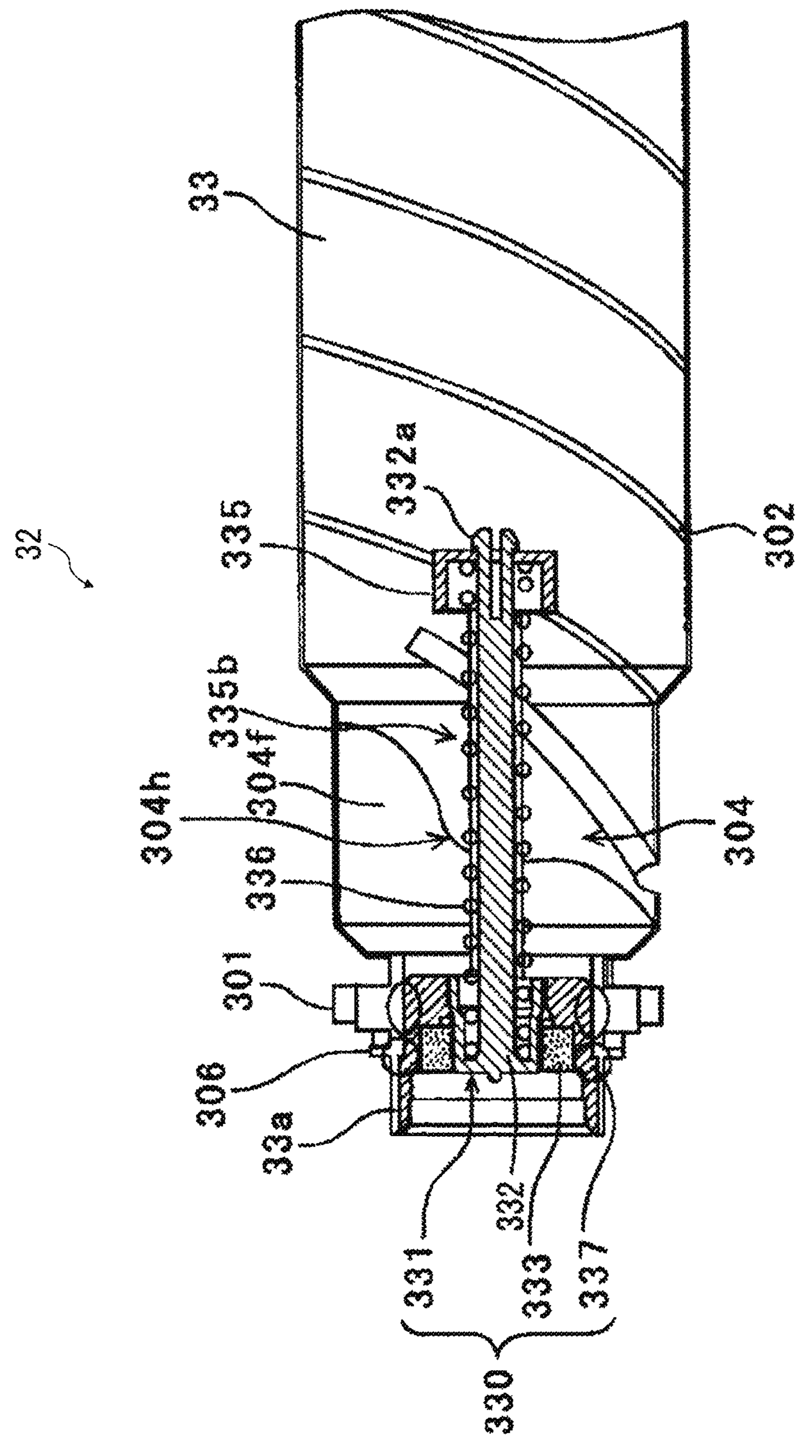
FIG. 9 is a cross-sectional diagram illustrating a state in which the nozzle receiver is attached to the toner container body from the state illustrated in FIG. 8.

FIG. 7 is a perspective view of the toner container 32 in a state where the nozzle receiver 330 serving as a tube insertion member is removed from the container body 33 from the state of FIG. 6. FIG. 8 is a cross-sectional view of the toner container 32 in the state where the nozzle receiver 330 is removed from the container body 33. FIG. 9 is a cross-sectional view of the toner container 32 (the toner container 32 in the state where the container front-end cover 34 is removed as in FIG. 6) in the state where the nozzle receiver 330 is attached to the container body 33 from the state of FIG. 8.

The container body 33 is substantially cylindrical and rotatable around a center axis of the cylindrical shape (i.e., the axis of rotation) as illustrated in FIGS. 6 and 7. Hereinafter, the direction parallel to the axis of rotation is referred to as "axial direction". Note that the longitudinal direction of the toner container 32 is the axial direction thereof, and the axial direction is kept horizontal when the toner container 32 is attached in the toner supply device 60. A portion (i.e., a large diameter portion) of the container body 33 closer to the container rear end than (in other words, upstream in the attachment direction Q from) the container gear 301 is larger in external diameter than the front end of the container body 33, and a spiral rib 302 is disposed on the inner surface of the large diameter portion. As the container body 33 rotates in the direction A illustrated in FIG. 4, the spiral rib 302 gives a conveyance force to the toner in the container body 33 in the direction from one end (the container rear end) to the other end (the container front end) in the axial direction. That is, a spiral projection as a conveyance portion is disposed inside the container body.

The inner wall in the container front end of the container body 33 includes a scooping portion 304 to lift (scoop) the toner being conveyed to the front end of the toner container 32 by the spiral rib 302 as the container body 33 rotates in the direction A in FIGS. 6 and 7. As illustrated in FIG. 9, the scooping portion 304 includes a convex portion **304*h* and a scooping wall surface 304*f*. The convex portion 304*h* is a portion (raised portion) that is raised inside the container body 33 so as to form a ridge of mountain toward the rotation center of the container body 33 while forming a spiral. The scooping wall surface 304*f* is a wall surface on the downstream side of the wall surface continuous from the convex portion 304*h* to the inner wall surface of the peripheral surface of the container body 33 when viewed from the rotation direction of the toner container 32 with the convex portion 304*h*** interposed therebetween.

When the scooping wall surface **304*f* is downward, the toner that has entered the internal space facing the scooping portion 304 due to the conveyance force of the spiral projection 302 is scooped upward by the scooping wall surface 304*f* in accordance with the rotation of the container body 33. Accordingly, the toner can be lifted higher than the conveyance nozzle 611 inserted into the container body 33. That is, the toner is lifted upward from below. As the rotation proceeds, the toner scooped by the scooping wall surface 304*f* follows gravity and slides down from the scooping wall surface 304*f*, or collapses and falls down. Since there is the conveyance nozzle 611** serving as a conveyance tube on the main body, which is described later, the toner is moved toward a nozzle opening of the conveyance tube.

Figure 10:
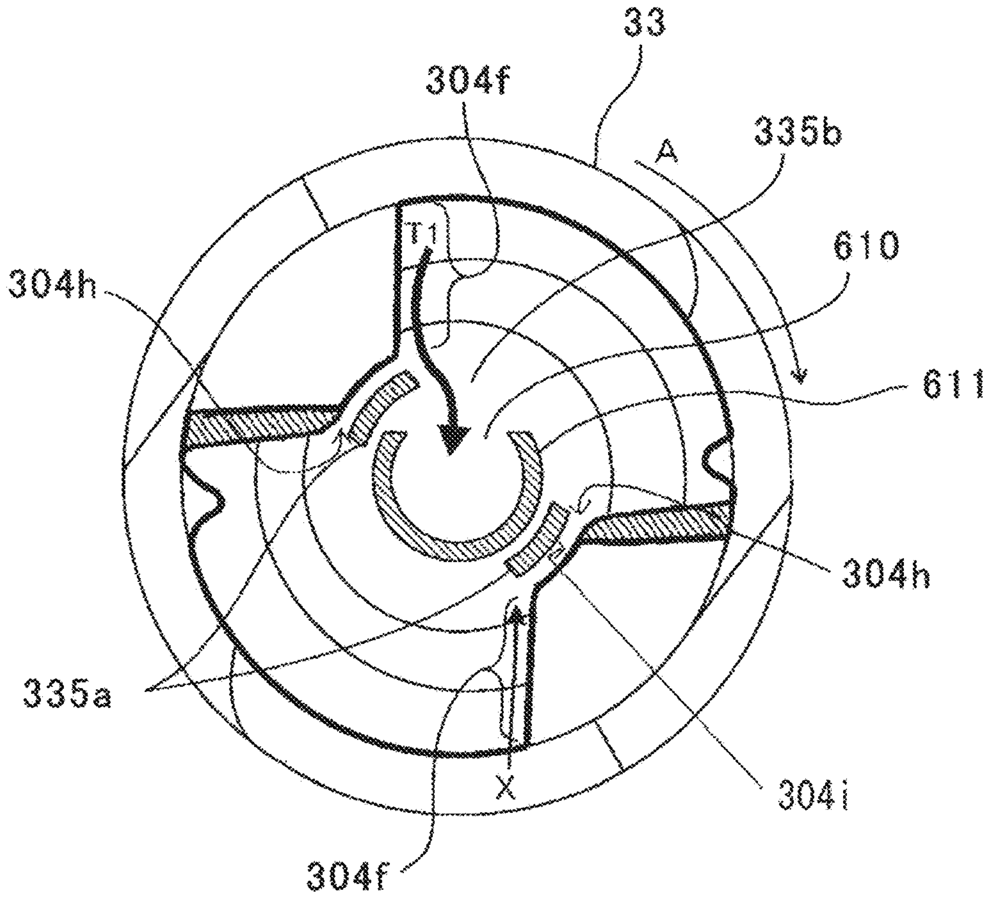
FIG. 10 is a cross-sectional view cut along line E-E in FIG. 5.

FIG. 10 is a cross-sectional view along line E-E in FIG. 5. As illustrated in FIG. 10, the convex portion **304*h* has a gentle mountain-shape due to an effect that the container body 33 is formed by blow molding. In FIG. 5, e.g., the convex portion 304*h* is represented by a curved line for convenience of distinguishing the scooping portion 304. The scooping wall surface 304*f* is an area represented by a grid in FIG. 5. As illustrated in FIG. 10, the area is a pair of slopes that connect the convex portion 304*h* and the inner peripheral surface of the container body 33 with the rotation axis of the container body 33 being as a reference point of point symmetry. The convex portion 304*h* is continuously disposed so as to extend from an inner wall surface of the container starting to rise toward an inner wall surface on the opposite side facing the inner wall surface and in the direction of the opening portion. At the position of the cross-section along line E-E as illustrated in FIG. 5, the cutting direction of the cross-section along line E-E in FIG. 5 is substantially the same as the extending direction of the wall surface on the upstream side in the container rotation direction among the inner wall surfaces divided by the convex portion 304*h*. Accordingly, the wall has a large thickness as illustrated in FIG. 10. The convex portion 304*h* is also at a position at which the convex portion 304*h*** appears to have a large thickness.

Figure 11:
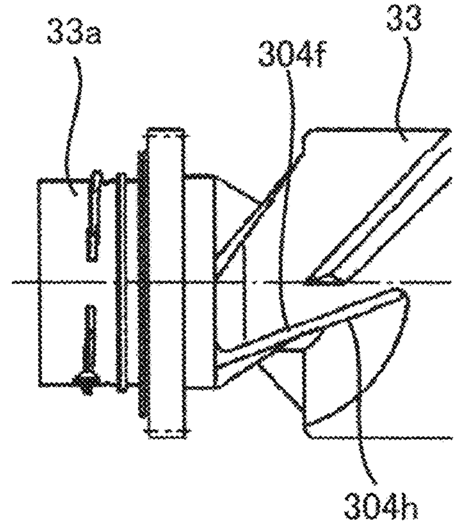
FIG. 11 is a side view of a configuration of the toner container.

Since the toner need to be conveyed toward the container opening portion **33*a*, as illustrated in FIG. 11, the scooping wall surface 304*f* tilts so as to be farther away from the longitudinal axis (indicated by one-dot chain line illustrated in FIG. 11) of the container body 33, from the convex portion 304*h* toward the container opening portion 33*a*. With such a configuration, when the scooping wall surface 304*f* scoops the toner and rotates, the scooping wall surface 304*f*** tilts toward the opening portion (in other words, the direction from the convex portion to the opening portion is tilted downward from the horizontal direction, more specifically, tilted outward in the radial direction of the container with respect to the longitudinal axis). Accordingly, the toner can be easily conveyed in the direction of the container opening portion.

The container gear 301 is disposed at a position closer to the front end of the toner container 32 than the scooping portion 304 in the container body 33. The container front-end cover 34 is partially cut away, providing a gear exposing opening **34*a*, to partially expose the container gear 301 (on the back side in FIG. 4) in a state in which the container front-end cover 34 is attached to the container body 33. When the toner container 32 is attached in the toner supply device 60, the container gear 301 exposed through the gear exposing opening 34*a* meshes with the container drive gear of the toner supply device 60**.

The cylindrical container opening portion **33*a* is disposed at a position closer to the front end of the toner container 32 than the container gear 301 in the container body 33. A receiver fixing portion 337 of the nozzle receiver 330 is press-fitted in the container opening portion 33*a* to secure the nozzle receiver 330 to the container body 33. The method of securing the nozzle receiver 330 is not limited to press fitting. Alternatively, the nozzle receiver 330 may be glued or screwed to the container body 33, for example. After the toner is replenished from the container opening portion 33*a* into the container body 33, the nozzle receiver 330 is secured to the container opening portion 33*a* of the container body 33**.

A cover-hook catch 306 is disposed at an end of the container opening portion **33*a* of the container body 33 closer to the container gear 301. The container front-end cover 34 (illustrated in FIG. 6) is attached from the front side of the toner container 32 (on the lower left side in FIG. 6) to the toner container 32 (the container body 33) being in the state illustrated in FIG. 6. The container body 33 penetrates the container front-end cover 34 in the axial direction, and a cover hook 341 disposed in an upper portion of the container front-end cover 34 is hooked to the cover-hook catch 306. The cover-hook catch 306 extends over the entire circumference of the container opening portion 33*a*. With the cover hook 341 hooked by the cover-hook catch 306, the container body 33 can rotate relative to the container front-end cover 34**.

The container body 33 is manufactured through biaxial stretch blow molding. Typically, biaxial stretch blow molding includes two steps of preform molding and stretch blow molding. In the preform molding step, resin is injected into a preform shaped like a test tube. During the step of injection molding, the container opening portion 33*a*, the cover-hook catch 306, and the container gear 301 are formed at a mouth portion of the test-tube-shaped preform. After the step of preform molding, the preform is cooled, removed from the mold, and heated (softened). Then, blow molding and stretch of the softened preform are executed (stretch blow molding).

The portion of the container body 33 closer to the rear end of the toner container 32 than the container gear 301 is formed in the step of stretch blow molding. That is, the scooping portion 304, the portion where the spiral rib 302 is formed, and the handle 303 are formed by stretch blow molding. The shape of the front end portion of the container body 33 including the container gear 301 and portions, such as the container opening portion 33*a* and the cover-hook catch 306, positioned closer to the front end of the toner container 32 than the container gear 301 is not changed from the preform produced by injection molding. Accordingly, dimensional accuracy can be high. One the other hand, the scooping portion 304, the portion including the spiral rib 302, and the handle 303, which are formed by stretch blow molding after injection molding, may be lower in dimensional accuracy than the preform portion.

Figure 12:
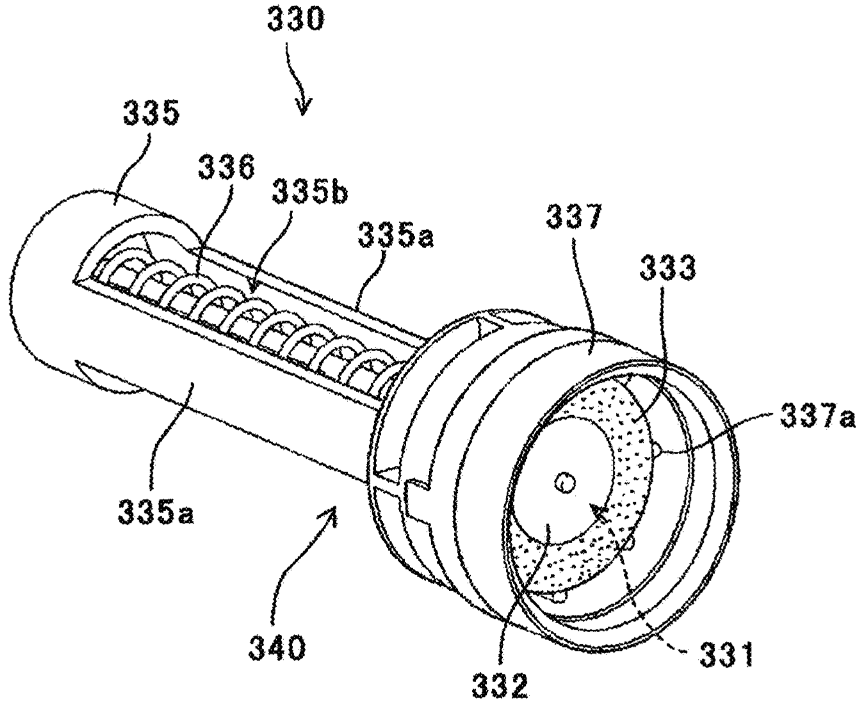
FIG. 12 is a perspective view of the nozzle receiver as viewed from the front end side of the toner container.
Figure 13:
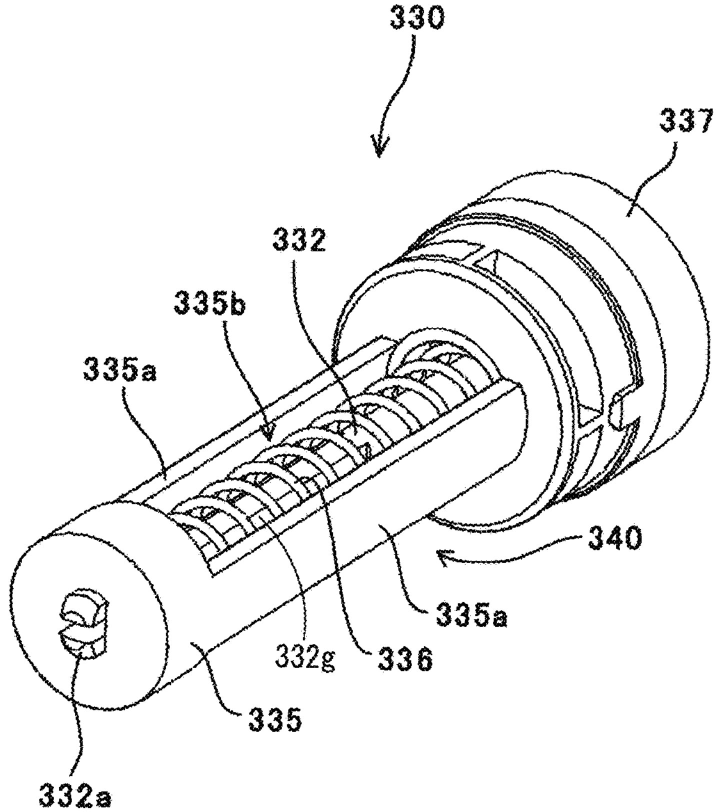
FIG. 13 is a perspective view of the nozzle receiver as viewed from the rear end side of the toner container.
Figure 14:
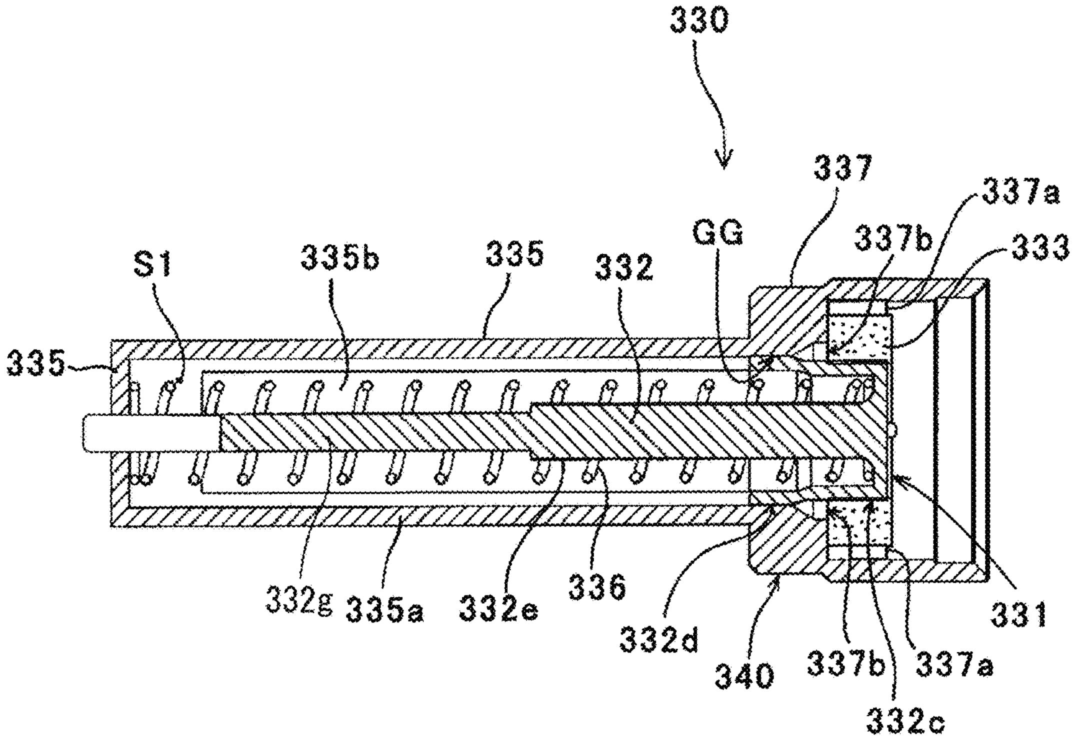
FIG. 14 is a cross-sectional view of an example of the nozzle receiver in the state illustrated in FIG. 9.
Figure 15:
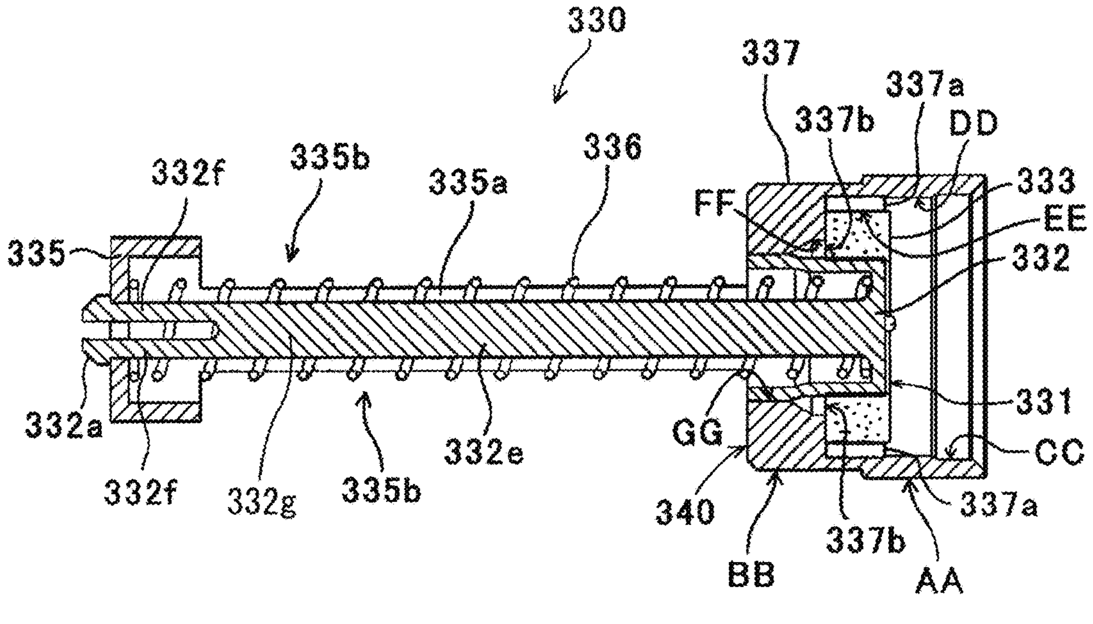
FIG. 15 is another cross-sectional view of an example of the nozzle receiver in the state illustrated in FIG. 9.
Figure 16:
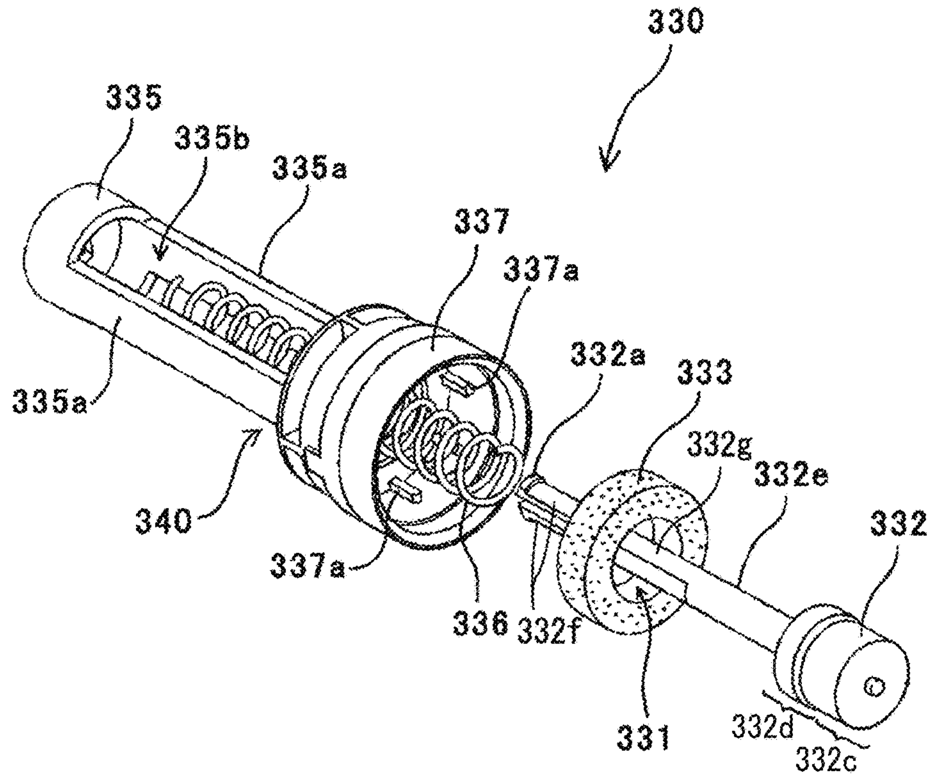
FIG. 16 is an exploded perspective view of an example of the nozzle receiver.

Next, the nozzle receiver 330 secured to the container body 33 is described below. FIG. 12 is a perspective view of the nozzle receiver 330 as viewed from the front side of the toner container 32. FIG. 13 is a perspective view of the nozzle receiver 330 as viewed from the rear side of the toner container. FIG. 14 is an upper cross-sectional view of the nozzle receiver 330 in the state illustrated in FIG. 9 as viewed from above. FIG. 15 is a lateral cross-sectional view of the nozzle receiver 330 in the state illustrated in FIG. 9 (back side in FIG. 9). FIG. 16 is an exploded perspective view of the nozzle receiver 330.

The nozzle receiver 330 includes a container shutter support 340 (serving as a support), the container shutter 332, a container seal 333 (serving as a seal member), a container shutter spring 336 (serving as a biasing member), and the receiver fixing portion 337. The container shutter support 340 includes a rear end support 335 (serving as a rear end portion), a pair of shutter side supports 335*a* (serving as side portions), and shutter support openings 335*b* and the receiver fixing portion 337 (serving as side opening). The container shutter spring 336 is, for example, a coil spring.

The shutter side support 335*a* and the shutter support opening 335*b* of the container shutter support 340 are arranged adjacent to each other in the direction of rotation of the toner container 32. The two shutter side supports 335*a* facing each other form a part of the cylindrical shape. The cylindrical shape is largely cut out at the portions (two places) of the shutter support openings 335*b*. Such a shape can guide the container shutter 332 to move, in the cylindrical space 51 (see FIG. 14) inside the cylindrical shape, along the insertion direction of the conveyance nozzle 611, in other words, move toward an opening position where the nozzle receiving port 331 is opened and a closing position where the nozzle receiving port 331 is closed. That is, the container body has a projection shape that projects from a portion of the container opening portion inside the container body toward the rear end of the toner container.

The nozzle receiver 330 secured to the container body 33 rotates with the container body 33 as the container body 33 rotates. At this time, the shutter side supports 335*a* of the nozzle receiver 330 rotate around the conveyance nozzle 611 of the toner supply device 60. The shutter side supports 335*a* and the shutter support openings 335*b* alternately pass a space just above the nozzle hole 610 formed in the upper portion of the conveyance nozzle 611. If the toner momentarily accumulates above the nozzle hole 610, the shutter side supports 335*a* cross and break the accumulation of toner. This structure restrains aggregation of toner while the apparatus is left unused and restrains poor conveyance of toner at restart of the apparatus. On the other hand, when the shutter side supports 335*a* are positioned on the lateral sides of the conveyance nozzle 611 and the nozzle hole 610 faces the shutter support opening 335*b*, the toner is supplied from the container body 33 through the shutter support opening 335*b* to the conveyance nozzle 611 as indicated by arrow β illustrated in FIG. 5.

The container shutter 332 includes a cylindrical end part 332*c* (serving as a closing portion), a sliding portion 332*d*, a guide rod 332*e*, and a pair of shutter retaining hooks 332*a*. The cylindrical end part 332*c* is a part disposed on the front end of the toner container 32 to tightly contact a cylindrical opening (the nozzle receiving port 331) of the container seal 333. The sliding portion 332*d* is closer to the rear end of the toner container 32 than the cylindrical end part 332*c* and slightly larger in diameter than the cylindrical end part 332*c*. The slide portion 332*d* is a cylindrical portion that slides on an inner circumferential face of the pair of shutter side supports 335*a*. The guide rod 332*e* is a rod standing from the inside of the cylinder of the cylindrical end part 332*c* toward the rear end of the toner container 32, and is a rod inserted into the coil of the container shutter spring 336 to guide the container shutter spring 336 not to buckle. The guide rod 332*e* includes a guide rod sliding portion 332*g* in an area closer to the rear end of the toner container 32. The guide rod sliding portion 332*g* is a pair of flat surfaces formed on both sides of the cylindrical guide rod 332*e* from the middle of the column-shaped guide rod 332*e* across the central axis of the guide rod 332*e*. The guide rod sliding portion 332*g* is bifurcated at a position closer to the rear end of the toner container 32 to form a pair of cantilevers 332*f*. Each one of the pair of shutter retaining hooks 332*a* is disposed at an end of the cantilever 332*f* opposite the rooted end of the guide rod 332*e*. The pair of shutter retaining hooks 332*a* is a pair of nail portions to prevent the container shutter 332 from slipping off the container shutter support 340.

As illustrated in FIGS. 14 and 15, a front-end portion of the container shutter spring 336 contacts an inner wall face of the container shutter 332, and a rear-end portion of the container shutter spring 336 contacts a wall face of the rear end support 335. Since the container shutter spring 336 is in a compressed state, the container shutter 332 is biased in a direction away from the rear end support 335 (in the right direction of FIGS. 14 and 15, and in a direction of the front end of the toner container 32). However, the shutter retaining hooks 332*a* at the rear end of the container shutter 332 are hooked on an outer wall of the rear end support 335. Thus, the container shutter 332 is prevented from moving away from the rear end support 335 as compared with the state illustrated in FIGS. 14 and 15. Positioning is performed by the hook of the shutter retaining hooks 332*a* on the shutter rear end support 335 and the biasing force of the container shutter spring 336. Specifically, the cylindrical end part 332*c*, which prevents leak of toner from the container shutter 332, and the container seal 333 are positioned in the axial direction relative to the container shutter support 340. Accordingly, the cylindrical end part 332*c* and the container seal 333 are positioned in close contact with each other, thus preventing leakage of toner.

The receiver fixing portion 337 has a tubular shape in which the diameters of the outer peripheral surface and the inner peripheral surface gradually decrease toward the rear end of the toner container 32. The diameters decrease when viewed from the front end of the toner container 32 toward the rear end of the toner container 32. As illustrated in FIG. 15, the outer peripheral surface has two outer diameter portions (outer peripheral surfaces AA and BB in order from the front end of the toner container). The inner peripheral surface has five inner diameter portions (inner peripheral surfaces CC, DD, EE, FF, and GG in order from the front end of the toner container. The boundary between the outer peripheral surface AA and the outer peripheral surface BB is continuous via a tapered surface. The boundary between the fourth inner peripheral surface FF and the fifth inner peripheral surface GG on the inner peripheral surface is also continuous via a tapered surface. The inner peripheral surface FF and a tapered surface continuous to the inner peripheral surface FF correspond to a seal entrainment prevention space 337*b* described later. The ridges of the inner peripheral surface FF and the tapered surface correspond to the sides of the pentagonal cross section described later.

As illustrated in FIGS. 14 to 16, the pair of shutter side supports 335*a*, which face each other in an area closer to the rear end of the toner container 32 than the receiver fixing portion 337 and have a cylindrical shape cut in the axial direction, project from the receiver fixing portion 337. Ends of the two shutter side supports 335*a* on the rear side of the toner container 32 are coupled to the rear end support 335 having a cup shape and a bottom with an oval hole. As the two shutter side supports 335*a* face each other, a columnar space 51 is defined by the cylindrical inner faces of the shutter side supports 335*a* and a virtual cylindrical face extending therefrom. The receiver fixing portion 337 has a fifth inner peripheral surface GG from the tip as a cylindrical inner peripheral surface having an inner diameter of the same size as the diameter of the columnar space 51. The sliding portion 332*d* of the container shutter 332 slidingly moves in the columnar space 51 and on the inner peripheral surface GG. The third inner peripheral surface EE of the receiver fixing portion 337 is a virtual circumferential surface passing through the longitudinal tops of the nozzle-shutter abutting ribs 337*a* arranged at equal intervals of 45 degrees distribution. The cylindrical (circular and tubular) container seal 333 having a quadrangular cross section (cross section of the cross-sectional views in FIGS. 14 and 15) is arranged corresponding to the inner peripheral surface EE. The container seal 333 is fixed to a vertical surface connecting from the third inner peripheral surface EE to the fifth inner peripheral surface FF with an adhesive, double-sided tape, or the like. The exposed surface on the side opposite to the attachment of the container seal 333 (right side in FIGS. 14 and 15) forms the inner bottom of the cylindrical opening of the cylindrical receiver fixing portion 337 (container opening portion).

As illustrated in FIGS. 14 and 15, the seal entrainment prevention space 337*b* (pinching prevention space) is formed corresponding to the inner peripheral surface FF of the receiver fixing portion 337 and the tapered surface continuous to the inner peripheral surface FF. The seal entrainment prevention space 337*b* is a ring-shaped sealed space surrounded by three different members. That is, the inner peripheral surface of the receiver fixing portion 337 (the fourth inner peripheral surface FF and the tapered surface continuous to the fourth inner peripheral surface FF), the vertical surface on the sticking side of the container seal 333, and a ring-shaped space surrounded by the outer peripheral surface from the cylindrical end part 332*c* of the container shutter 332 to the sliding portion 332*d*. The cross section of this ring-shaped space (cross section in the cross sections of FIGS. 14 and 15) has a pentagonal shape. Bothe of an angle formed by the inner peripheral surface of the receiver fixing portion 337 and the end face of the container seal 333 and an angle formed by the outer peripheral surface of the container shutter 332 and the end face of the container seal 333 are 90 degrees.

Even in the above-described configurations, the shutter retaining hooks 332*a* formed at the end of the container shutter 332 closer to the rear side of the toner container 32 may not be hooked and may be disconnected from the outer wall surface of the shutter rear end support 335 when a stronger impact than expected is applied from the outside. For example, the failure described above may occur when the container shutter 332 deteriorates. In such a case, the container shutter 332 may pop out from the nozzle receiver 330.

Figure 17A:
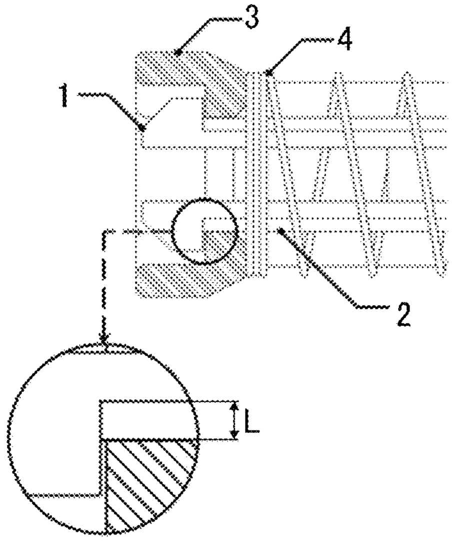
FIGS. 17A and 17B are schematic diagrams illustrating an example of the popping out of a deteriorated shutter of the container.
Figure 17B:
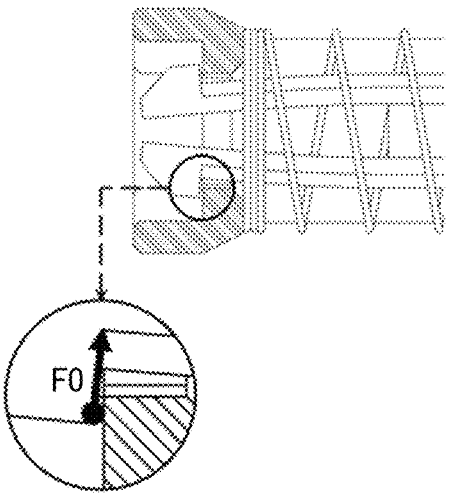

Here, the popping out of the container shutter 332 is described. FIGS. 17A and 17B are schematic diagrams illustrating the popping out of a deteriorated shutter of the container. In FIG. 17A, claws 1, two shafts 2, a holder 3, and a spring 4 are illustrated as follows in association with the toner container 32 described above. The claws 1 represent the shutter retaining hooks 332*a* of the container shutter 332 described above. The two shafts 2 represent the cantilevers 332*f*. The holder 3 represent the shutter rear end support 335. The spring 4 represent the container shutter spring 336.

The popping out of the deteriorated container shutter 332 is caused by the fact that when the two claws 1 are slightly and simultaneously closed due to an impact, the elastic force of the spring 4 further applies a force in the closing direction of the claws 1. FIGS. 17A and 17B include enlarged views of the portion, surrounded by a circle, where one claw 1 is hooked on the holder 3 indicated with an arrow. FIG. 17A illustrates a state where the claw 1 is hooked on the holder 3. FIG. 17B illustrates a state where the spring 4 deforms in the direction in which the two shafts 2 approach to each other and the amount of the claw 1 hooked on the holder 3 is reduced. In the state on FIG. 17B, a force is applied to the shaft 2 by the spring 4 in the direction indicated by arrow F0, so that the claw 1 disconnects from the holder 3.

Therefore, shutter mechanisms according to the following embodiments are provided for the purpose of preventing a failure that the claw 1 (shutter retaining hooks 332*a*) is not hooked on and disconnects from the outer wall surface of the holder 3 (shutter rear end support 335), even when a stronger impact than expected is applied from the outside. According to each of the following embodiments, closing the two claws 1 at the same time due to an impact or decreasing in holding force when the two claws 1 are slightly closed are prevented.

In each of the embodiments described below, the shutter mechanism of an embodiment includes at least a shutter, a shutter support, and an elastic member. The shutter moves in one direction and closes. Specifically, the shutter is a member that moves along one direction to open and close the entrance (opening), moves in one direction to close, and moves in the other direction to open. One direction is a direction (direction along the above-described axial direction) along the line of action of the elastic force of the elastic member (for example, the spring 4). As the shutter, a material that the holding function does not deteriorate due to the deterioration of each member or the action of the impact force may preferably be used.

The shutter has an abutting portion and a beam. The abutting portion is hooked on the shutter support while being biased by the elastic member. The abutting portion automatically closes the shutter with the elastic member, and acts as a holding mechanism to fix the shutter in the closing position. The beam enables the abutting portion in the direction intersecting with one direction. The shutter support is a member that supports the shutter. The elastic member is a member that biases the shutter and the shutter support in opposite directions.

The shutter mechanism according to each of the following embodiments is characterized that the hooking amount or contact area between the abutting portion and the shutter support is larger after an elastic deformation of the beam due to the biasing force of the elastic member than before the elastic deformation. The hooking amount refers to the distance from the edge of the support to the farthest position of the contact points between the abutting portion and the support. The distance of reference numeral L is indicated in the circle on the left side in FIG. 17A as an example of the hooking amount. Each of the following embodiments is described using the configuration example of the claws, the shafts, the holder, and the spring illustrated in FIG. 17A. The shutter mechanism according to one embodiment uses these configurations as claws (serving as the abutting portion), two shafts (serving as the beam), a holder (serving as a part of the shutter support), and a spring (serving as the elastic member).

When the shutter mechanism according to one embodiment is applied to the toner container 32 described above, the shutter mechanism includes, for example, the container shutter 332 (serving as the shutter), the shutter retaining hook 332*a* (serving as the abutting portion), and the cantilever 332*f* (serving as the beam), the shutter rear end support 335 or the container shutter support 340 having the shutter rear end support 335 (serving as the shutter support), and the container shutter spring 336 (serving as the elastic member). That is, the shutter mechanism according to one embodiment includes the container seal 333, e.g., in the container shutter 332 described above. The description thereof is omitted in each of the following embodiments. Some features of each embodiment are described below.

First Embodiment

A first embodiment is characterized that the abutting portion has an elastic function and is elastically deformed in a direction away from the beam by a force in a direction in which the elastic member biases. In such a configuration, the hooking amount by which the abutting portion hooks the shutter support is larger after elastic deformation than before elastic deformation. The hooking amount may be the contact area where the abutting portion contacts the shutter support, or the amount by which the abutting portion and the shutter support overlap (for example, the length from the edge of the opening through which the beam of the shutter support passes to the end of the abutting portion).

In the first embodiment, the beam moves the abutting portion in the direction intersecting with one direction by an elastic deformation. The beam is elastically deformable so that, for example, the abutting portion moves in a direction orthogonal to one direction. In the shutter, the abutting portion and the beam may be formed of an integrated single member.

FIGS. 18A and 18B are schematic diagrams illustrating a main section of a shutter mechanism according to the first embodiment. The shutter mechanism includes at least claws 11, shafts 12, a holder 3, and a spring 4. FIGS. 18A and 18B include enlarged views of the portion, surrounded by a circle, where one claw 11 is hooked on the holder 3 indicated with an arrow, similar to FIGS. 17A and 17B.

In the first embodiment, the claw 11 (serving as the abutting portion) has a structure having an elastic function. With this structure, the elastic force of the claw 11 and the shaft 12 provided with the claw 11 is increased. The claw 11 is less likely to close even if an impact is applied. In addition, even if the shaft 12 is slightly closed, the elastic force of the spring 4 acts in the direction in which the claw 11 opens. Specifically, when a force is applied in the direction in which the shaft 12 is closed by the elastic force of the spring 4, the claw 11 is stretched by the elastic function, so that the force applied in the direction of arrow F1 in FIG. 18B acts. As a result, the popping out of the shutter is prevented even if an impact is applied.

As described above, the shutter is made of a single member in which the claws 11 (abutting portion) as the holding mechanism and the two shafts 12 (beam) are integrated. The shutter has a plurality of elastic functions as follows. The claw 11 is elastically deformable in a direction intersecting with one direction (for example, a direction orthogonal to each other). Further, the claw 11 has a structure having an elastic function (extending function). With such a configuration, when the shutter receives an impact force, a force that the shutter returns to the closing position acts due to an elastic force. Thus, a holding function does not decrease even if an impact is applied.

Second Embodiment

A second embodiment is characterized that the abutting portion is formed at an acute angle in one direction. With such a configuration, the hooking amount by which the abutting portion hooks the shutter support is larger after elastic deformation than before elastic deformation. In the second embodiment, the beam has the same configuration as in the first embodiment. The abutting portion and the beam may be formed of an integrated single member.

FIGS. 19A and 19B are schematic diagrams illustrating a main section of a shutter mechanism according to the second embodiment. The shutter mechanism includes at least claws 21, shafts 22, a holder 3, and a spring 4. FIGS. 19A and 19B include enlarged views of the portion, surrounded by a circle, where one claw 21 is hooked on the holder 3 indicated with an arrow, similar to FIGS. 17A and 17B.

In the second embodiment, the angle between the tips of the two claws 21 is acute. With this structure, when the shaft 22 provided with the claw 21 is slightly closed by the impact, the claw 21 and the holder 3 contact with each other on a surface. Thus, even if the claw 21 is slightly closed, the elastic force of the spring 4 acts in the direction in which the claw 21 pushes the holder 3. Specifically, a force applied in the direction of arrow F2 in FIG. 19B acts. As a result, the popping out of the shutter is prevented.

As described above, the claw 21 (abutting portion) as the holding mechanism of the shutter contacts the surface perpendicular to the line of action of the elastic force by the holder 3 and the spring 4 (elastic member) at the closed position with a point or a line. The shape of the claw 21 is such that the claw 21 contacts with a surface when an impact force is applied. When the claw 21 receives an impact force, the area that receives the force is large, so that the holding function does not decrease due to the action of the impact force.

Third Embodiment

A third embodiment is characterized that a shutter has an abutting portion that is hooked on a shutter support in a state of being biased by an elastic member. The shutter support has an opening portion through which the shutter penetrates at the contact surface with the abutting portion. The opening portion has a shape that does not contact the abutting portion at a specified position. FIGS. 20A to 20D are schematic diagrams illustrating a main section of a shutter mechanism according to the third embodiment. The shutter mechanism includes at least claws 31, a beam 35, a holder 36, and a spring 4. Further, the shutter mechanism may include a rotation regulator 37. In FIG. 20A, an enlarged perspective view of the claws 31, the holder 36, and so forth surrounded by a rectangle is indicated with an arrow. FIGS. 20B to 20D are diagrams illustrating an end face as seen from arrow A1 illustrated in FIG. 20A. FIG. 20B is a diagram illustrating the holder 36 alone before assembly of the beam 35. FIG. 20C is a diagram illustrating the holder 36 assembled with the beam 35 in which the rib 35*c* is not illustrated. FIG. 20D is a diagram illustrating the holder 36 assembled with the beam 35 in which the rib 35*c* is illustrated.

In the third embodiment, the shutter has a structure in which the claws 31 serve as a holding mechanism that functions by rotation. The position of the shutter is fixed by pressing the claws 31 against the holder 36 by the elastic force of the spring 4. By adding the rotation regulator 37, the shutter does not pop out if the shutter does not rotate after moving to a position where the rotation regulator does not act. Accordingly, the shutter withstands the impact force that causes a strong load in a short time.

The beam 35 is provided with the claw 31 as the abutting portion at the tip portion of the shaft 35*a*. The holder 36 has an opening portion 36*b* having such a size that the claw 31 of the shutter penetrates from the front side of the toner container 32 toward the rear side of the toner container 32 together with a part of the shaft 35*a* on the contact surface 36*a* with which the claw 31 abuts. The opening portion 36*b* has a shape in which the claw 31 does not return toward the front side of the toner container 32 when rotated after passing through the contact surface 36*a* from the front side of the toner container 32 toward the rear side of the toner container 32. FIGS. 20A to 20D are illustrating a state in which the claws 31 are hooked on the contact surface 36*a*. The claws 31 are hooked on the contact surface 36*a* in the state in which the shutter is biased by the spring 4. In addition, on a portion of the shaft 35*a* closer to the rear side than the opening portion (a position away from the front end where the abutting portion is located), a rib 35*c* that passes through the opening portion in the above-described hooked state is disposed. This is a restraining structure that restrains the rotation of the shaft 35*a* from the state of being hooked by the shaft 35*a* when opening and closing the shutter. The rib 35*c* may be omitted when there is little concern that a force is normally applied in the rotation direction or when there is another restraining structure.

As described above, the claws 31 (abutting portion) as the holding mechanism of the shutter have a structure that functions in the direction of action of the elastic force by the elastic member and the direction of rotation around the line of action. Since the holding force does not decrease unless multiple forces act in stages, the holding function does not decrease due to the action of the impact force.

Fourth Embodiment

A fourth embodiment is characterized that the plurality of abutting portions are disposed at different positions in the above-described one direction. In the fourth embodiment, the beam has the same configuration as in the first embodiment. The abutting portion and the beam may be formed of an integrated single member.

FIGS. 21A and 21B are schematic diagrams illustrating a main section of a shutter mechanism according to the fourth embodiment. The shutter mechanism includes at least claws 41, shafts 42, a holder 3, and a spring 4. FIGS. 21A and 21B include enlarged views of the portion, surrounded by a circle, where the claws 41 are hooked on the holder 3 indicated with an arrow, similar to FIGS. 17A and 17B.

In the fourth embodiment, the shafts 42 of the two claws 41 have different lengths. Specifically, the lengths of the shafts 42 of the two claws 41 are different so that the two claws 41 are at different positions (arranged at different positions in one direction) along the line of action of the elastic force. As a result, the two claws 41 do not close at the same time when an impact force is applied, thus preventing the popping out of the shutter. For example, the upper claw 41 contacts the holder 3, and the lower claw 41 does not contact the holder 3, on the left side of FIG. 21A. When the shaft 42 is elastically deformed from this state, the shaft 42 is in the state of FIG. 21B. At this time, a force in the direction indicated by arrow F4 acts on the lower shaft 42 in which the claw 41 does not contact the holder 3. Accordingly, a failure that the claw 41 comes off from the holder 3 is prevented.

As described above, the claws 41 (abutting portion) as the holding mechanism of the shutter do not have symmetry with respect to the line of action of the elastic force by the spring 4 (elastic member). The claw 41 has a shape that supports the impact force at one point with respect to the holder 3. With such a configuration, the impact force received by the shutter is dispersed in a direction different from the elastic force of the elastic member, so that the holding function does not decrease due to the action of the impact force.

Fifth Embodiment

A fifth embodiment is characterized that an abutting portion of a shutter has a protruding portion protruding toward a shutter support. The shutter support has a concave in which the protruding portion (projecting portion) is accommodated. In the fifth embodiment, the beam has the same configuration as in the first embodiment. The abutting portion, the beam, and the projecting portion may be formed of an integrated single member.

FIG. 22 is a schematic diagram illustrating a main section of a shutter mechanism according to the fifth embodiment. The shutter mechanism includes at least claws 51, shafts 52, a holder 53, a spring 4, and protruding portions 57. FIG. 22 includes an enlarged view of the portion, surrounded by a circle, where one claw 21 is hooked on the holder 3 indicated with an arrow.

In the fifth embodiment, the protruding portion 57 is disposed at the tip of the claw 51. The holder 53 has a concave in which the protruding portion 57 is accommodated. With this structure, the protruding portion 57 contacts the inner wall of the concave when an impact force is applied so that the claw 51 closes. Accordingly, the claw 51 does not close, thus preventing the popping out of the shutter.

Other Embodiments

The toner container 32 having the shutter mechanism according to any of the embodiments described above is used as a toner cartridge filled with toner. The toner container 32 having the shutter mechanism according to any of the above embodiments can be detachably attached to the image forming apparatus described above.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

This patent application is based on and claims priority to Japanese Patent Application No. 2020-156110, filed on Sep. 17, 2020, in the Japan Patent Office, the entire disclosure of which is hereby incorporated by reference herein.

REFERENCE SIGNS LIST

11, 21, 31, 41, 51 Claw (Abutting portion)
12, 22, 42, 52 Shaft (Beam)
3, 36 Holder (Shutter support)
4 Spring (Elastic member)
32 Toner container
35 Beam
35*a*, 35*b* Shaft
36*a* Contacting surface
36*b* Opening portion
37 Rotation regulator
57 Protruding portion
332 Container shutter (Shutter)

The invention claimed is:

1. A shutter mechanism comprising:
a shutter to move in one direction to close an opening,
a shutter support supporting the shutter; and
an elastic to bias the shutter and the shutter support in opposite directions,
wherein the shutter includes an abutting portion to hook on the shutter support with the abutting portion being biased by the elastic,
wherein the shutter further includes a beam which is elastically deformable such that the abutting portion deforms in a direction intersecting the one direction,
wherein the shutter mechanism includes another abutting portion, and
wherein the abutting portion and the another abutting portion are disposed at different positions in the one direction.

2. The shutter mechanism according to claim 1,
wherein a hooking amount of the abutting portion on the shutter support or a contact area between the abutting portion and the shutter support is larger after an elastic deformation of the beam due to a biasing force of the elastic or a force having a same direction with the biasing force than before the elastic deformation of the beam.

3. The shutter mechanism according to claim 1,
wherein the abutting portion has an elastic function and is to deform in a direction away from the beam by a force in a direction in which the elastic biases or a force having a same direction as a biasing force of the elastic.

4. The shutter mechanism according to claim 1,
wherein the abutting portion is formed at an acute angle with respect to the one direction.

5. The shutter mechanism according to claim 1,
wherein the abutting portion has a protruding portion that protrudes toward the shutter support, and
wherein the shutter support has a concave portion that the protruding portion accommodates.

6. The shutter mechanism according to claim 1,
wherein the shutter support has a contact surface contacting the abutting portion and an opening portion through which the shutter penetrates in the contact surface, and
wherein the opening portion has a shape not contacting the abutting portion at a position and has a shape contacting the abutting portion at another position different from the position.

7. A toner container comprising the shutter mechanism according to claim 1.

8. A toner cartridge comprising:
the toner container according to claim 7; and
toner within the toner container.

9. An image forming apparatus comprising the toner container according to claim 7,
wherein the toner container is detachably attached in the image forming apparatus.

10. The shutter mechanism according to claim 1, wherein:
at least one of the abutting portion and the shutter support has a hook strengthening structure to strengthen hooking of the shutter on the shutter support.

11. A shutter mechanism, comprising:
a shutter to move in one direction to close an opening,
a shutter support supporting the shutter; and
an elastic to bias the shutter and the shutter support in opposite directions,
wherein the shutter includes an abutting portion to hook on the shutter support with the abutting portion being biased by the elastic,
wherein the shutter further includes a beam which is elastically deformable such that the abutting portion deforms in a direction intersecting the one direction,
wherein the abutting portion has a protruding portion that protrudes toward the shutter support, and
wherein the shutter support has a concave portion that the protruding portion accommodates.

12. The shutter mechanism according to claim 11,
wherein a hooking amount of the abutting portion on the shutter support or a contact area between the abutting portion and the shutter support is larger after an elastic deformation of the beam due to a biasing force of the elastic or a force having a same direction with the biasing force than before the elastic deformation of the beam.

13. The shutter mechanism according to claim 11,
wherein the abutting portion has an elastic function and is to deform in a direction away from the beam by a force in a direction in which the elastic biases or a force having a same direction as a biasing force of the elastic.

14. The shutter mechanism according to claim 11,
wherein the abutting portion is formed at an acute angle with respect to the one direction.

15. The shutter mechanism according to claim 11,
wherein the shutter support has a contact surface contacting the abutting portion and an opening portion through which the shutter penetrates in the contact surface, and wherein the opening portion has a shape not contacting the abutting portion at a position and has a shape contacting the abutting portion at another position different from the position.

16. A toner container comprising the shutter mechanism according to claim 11.

17. A toner cartridge comprising:

the toner container according to claim 16; and toner within the toner container.

18. An image forming apparatus comprising the toner container according to claim 16, wherein the toner container is detachably attached in the image forming apparatus.

19. The shutter mechanism according to claim 11, wherein:

wherein at least one of the abutting portion and the shutter support has a hook.

* * * * *